United States Patent
Moataz et al.

(10) Patent No.: US 10,095,719 B2
(45) Date of Patent: Oct. 9, 2018

(54) METHOD AND SYSTEM TO PERFORM SECURE BOOLEAN SEARCH OVER ENCRYPTED DOCUMENTS

(71) Applicant: Alcatel Lucent, Boulogne Billancourt (FR)

(72) Inventors: Tarik Moataz, Fort Collins, CO (US); Abdullatif Shikfa, Nozay (FR)

(73) Assignee: ALCATEL LUCENT, Boulogne-Billancourt (FR)

( * ) Notice: Subject to any disclaimer, the term of this patent is extended or adjusted under 35 U.S.C. 154(b) by 508 days.

(21) Appl. No.: 14/417,587

(22) PCT Filed: Sep. 12, 2013

(86) PCT No.: PCT/EP2013/068900
§ 371 (c)(1),
(2) Date: Jan. 27, 2015

(87) PCT Pub. No.: WO2014/041066
PCT Pub. Date: Mar. 20, 2014

(65) Prior Publication Data
US 2015/0193486 A1    Jul. 9, 2015

(30) Foreign Application Priority Data

Sep. 14, 2012 (EP) .................................. 12184399

(51) Int. Cl.
G06F 17/30 (2006.01)
H04L 9/00 (2006.01)
G06F 21/62 (2013.01)

(52) U.S. Cl.
CPC .. *G06F 17/30324* (2013.01); *G06F 17/30011* (2013.01); *G06F 17/30424* (2013.01); *G06F 21/6227* (2013.01); *H04L 9/00* (2013.01)

(58) Field of Classification Search
None
See application file for complete search history.

(56) References Cited

U.S. PATENT DOCUMENTS 6,189,002 B1 *   2/2001   Roitblat ............. G06F 17/3061
9,684,710 B2 *   6/2017   Lokam ............. G06F 17/30631
(Continued)

FOREIGN PATENT DOCUMENTS

| JP | 2002278970 | 9/2002 |
|---|---|---|
| JP | 2005050197 | 2/2005 |
| WO | 2005114478 | 12/2005 |

OTHER PUBLICATIONS

Ming, L. et al; Authorized Private Keyword Search over Encrypted Personal Health Records in Cloud Computing; The 30th International Conference on Distributed Computing Systems (ICDCS 2011); Jun. 24, 2011; pp. 1-12; XP055053072; Minneapolis, MN; USA.

(Continued)

*Primary Examiner* — Khanh B Pham
(74) *Attorney, Agent, or Firm* — Patti & Malvone Law Group, LLC

(57) ABSTRACT

A method to perform secure boolean search over encrypted documents is disclosed. Each document is characterized by a set of keywords, all the keywords characterizing all the documents forming an index, the index being translated in an orthonormal basis in which each keyword of the index corresponds to one and only one vector of the orthonormal basis, each document being associated with a resultant vector in the span of the orthonormal basis, the resultant vectors corresponding to all the documents being stored in an encrypted search server. The method includes steps of receiving a search query from a querier; transforming the search query in one query matrix; and determining a general (Continued)

result based on the result of the multiplication between the query matrix and the resultant vectors.

14 Claims, 2 Drawing Sheets

(56) References Cited

U.S. PATENT DOCUMENTS

| | | | |
|---|---|---|---|
| 2005/0027678 A1* | 2/2005 | Aono | G06F 17/30631 |
| 2005/0166046 A1 | 7/2005 | Bellovin et al. | |
| 2006/0155751 A1* | 7/2006 | Geshwind | G06F 17/3064 |
| 2012/0078914 A1 | 3/2012 | Roeder et al. | |

OTHER PUBLICATIONS

Katz, J. et al; Predicate Encryption Supporting Disjunctions, Polynomial Equations, and Inner Products; Apr. 13, 2008; Advances in Cryptology A Eurocrypt 2008; [Lecture notes in Computer Science], Springer Berlin Heidelberg, Berlin, Heidelberg; pp. 146-162; XP019088229; ISBN: 978-3-540-78966-6.

* cited by examiner

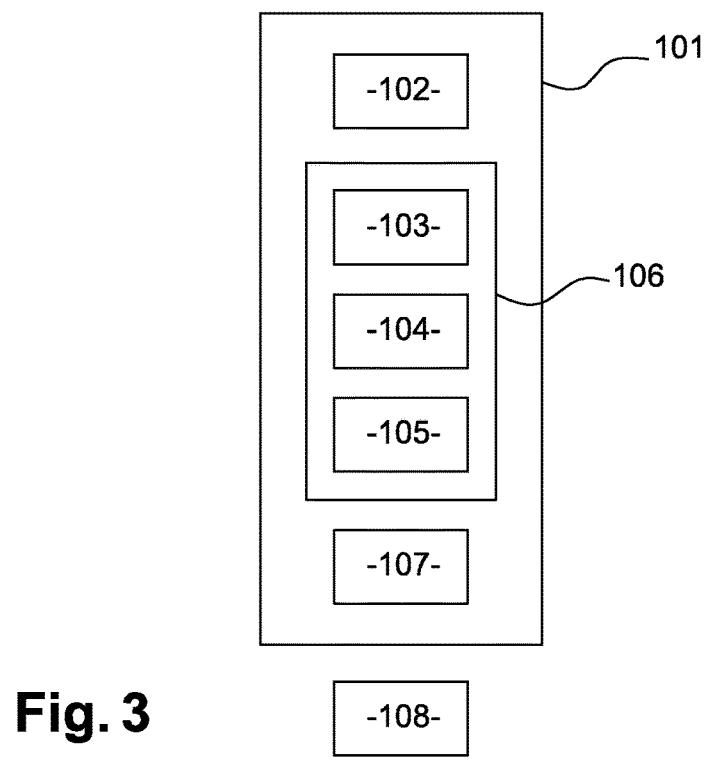
Fig. 3
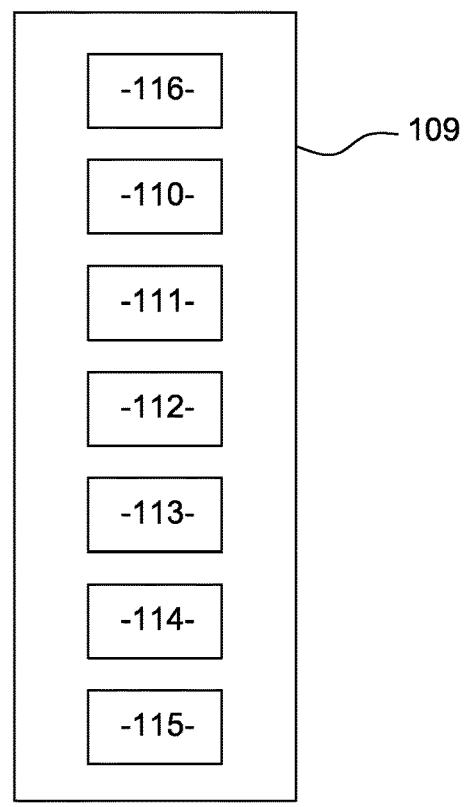

METHOD AND SYSTEM TO PERFORM SECURE BOOLEAN SEARCH OVER ENCRYPTED DOCUMENTS

TECHNICAL FIELD

The present invention relates to a method and system to perform secure Boolean search over encrypted documents.

BACKGROUND

The value of many cloud services lies in the ability to operate on client's data. Typical examples include data storage, webmail service, advertising, geolocation services, etc. However, the need to access client's data, e.g., files, email, location is often at odds with clients' data privacy needs, which require encryption to protect their data. Reconciling these contradictory requirements, and achieving computation on encrypted data, is an important research and engineering problem.

We focus here on the specific case of indexing and searching on documents. Typically to perform a search on a set of documents, one creates an index of keywords included in the documents and later on performs the search on the index. This does not raise major issues if the querier, who is defined as the one who requests the search, and the storage provider, who is defined as the one who stores the documents and the index and who actually performs the search and returns the result, fully trust each other. The difficulties arise when the querier wants to protect the privacy of its data and store the documents as well as the indexes encrypted, and send encrypted queries as well. In that case, it would be advantageous to be able to perform encrypted searches on a collection of encrypted documents. And more precisely, it would be advantageous to be able to perform all kind of encrypted searches on a collection of encrypted documents, including any Boolean search, such as conjunctive, disjunctive and negative searches.

By "disjunctive search", we mean a search allowing the user to search for encrypted documents containing $word_1$ or $word_2$ ... or $word_n$. By "conjunctive search", we mean a search allowing the user to search for the encrypted documents containing: "$word_1$ and $word_2$ ... and $word_n$". By "negative search", we mean a search allowing the user to search for all encrypted documents which do not contain one or several particular words.

Currently, there is no solution enabling to perform Boolean search on encrypted data, i.e. conjunctive, disjunctive and negation search option at the same time.

SUMMARY OF THE INVENTION

The technical problem to solve is then to provide a method enabling to perform any kind of boolean search on encrypted documents, i.e. conjunctive, disjunctive and negation search option at the same time.

To this purpose, the invention relates to a method to perform a boolean search over encrypted documents, each document being characterized by a set of keywords, all the keywords characterizing all the documents forming an index, the index being translated in an orthonormal basis such that each keyword of the index corresponds to one and only one vector of the orthonormal basis, each document being associated with a resultant vector in the span of the orthonormal basis, the resultant vectors corresponding to all the documents being stored in an encrypted search server, the method comprising the following steps:

Receiving a search query from a querier;
Transforming the search query in one query matrix;
Determining a general result based on the result of the multiplication between the query matrix and each of the resultant vectors.

The approach according to the invention is then to consider the keywords in the index as vectors and to pad them so that they form a family of independent vectors. From such a family we construct an orthonormal basis of the resulting vector space, which means that each keyword in the index is associated with one vector of this orthonormal base. Then to each document we associate a resultant vector resulting of a linear combination of all vectors representing the keywords characterizing the document.

The queries are then expressed as a matrix comprising several rows in the same vector space using the same orthonormal basis and we use scalar product between each row of the query matrix and the resultant vector corresponding to a document to decide whether that document satisfies a search query or not.

The documents can then stay encrypted and secret since the method only uses the vectors of the orthonormal basis to achieve the search. This association between a keyword and the corresponding vector is a secret in the sense that by observing only a vector one cannot tell what is the corresponding keyword, and even by knowing all the vectors of the orthonormal basis one cannot invert the process and learn the keywords. In some sense this can be seen as a specific type of encryption of the keywords index.

According to one embodiment of the invention, the index is translated in an orthonormal basis at least by:
Transforming the index in a free family;
Transforming the free family in an orthogonal family;
Transforming the orthogonal family in an orthonormal family which forms the orthonormal basis.

As a matter of fact, according to the invention, the first step is the construction of the orthonormal basis. This first step occurs before the encryption of the documents. To that purpose, the document owner has a collection of documents. He first generates an index out of these documents and this index will be used to create the resultant vectors and to perform searches. The index consists in selecting the keywords out of the documents or the keywords describing these documents, like tags for example. The index contains all the keywords associated with all documents and not only to one document. Then from this index the orthonormal basis is generated. What counts in the end is that to each keyword in the index corresponds one and only one vector of the orthonormal basis.

According to a preferred embodiment of the invention, the step of transforming the free family in the orthogonal family is achieved by using a Gram-Schmidt Orthogonalisation algorithm.

According to another embodiment of the invention, the index is translated in the orthonormal basis at least by:
Generating an orthonormal basis of size the number of keywords in the index,
Associating one vector of the orthonormal basis to each keyword of the index through any one to one function.

Once the index is transformed in the orthonormal basis, a resultant vector from the span of the orthonormal basis can be associated to each document.

The resultant vector associated with one of the documents can be determined, prior to the encryption of the document, by adding all the vectors corresponding to all the keywords characterizing the document.

After that, each document can be encrypted by using a secret key. The encryption algorithm can be any standard one such as Advanced Encryption Standard. The owner can then keep the key secret.

After having performed these operations the owner can outsource the storage of the encrypted documents: he can send the encrypted documents to a storage provider and send the corresponding vectors to the encrypted search server. In practice a same entity could play both the role of the storage provider and of encrypted search server or they can be separate entities. If the same entity plays both roles then the association between a resultant vector and a document is known by this entity, while if the roles are played by two distinct entities this correspondence between a resultant vector and a document is unknown to any of them and should be stored by the owner in a secret conversion table.

Once this setup phase is over the query phase can start. That query phase only uses the resultant vectors. Consequently the encrypted documents are not needed anymore.

According to one embodiment of the invention, the search query comprises search keywords, each search keyword being associated with one negative or one positive operator, the step of transforming the search query in the query matrix comprising several rows comprises the following steps:

Expressing the query in disjunctive normal form, i.e. as disjunction of conjunctive clauses, Separating in each conjunctive clause the keywords associated with a positive operator from those associated with a negative operator, Transforming in each conjunctive clause:
  each search keyword associated with a positive operator in an vector, called "positive vector", in the span of the orthonormal basis;
  each search keyword associated with a negative operator in an vector, called "negative vector", in the span of the orthonormal basis;

Determining the search query as a matrix where each row corresponds to one conjunctive clause and each row is a vector based on the positive and negative vectors, each row comprising a first sum in which the positive vectors are gathered and a second sum in which the negative vectors are gathered.

In that document, we call "positive operator", keywords without negation "not" in the Boolean search expression, and we call "negative operator", keywords preceded by the operator "not" in the Boolean search expression.

The correspondence between each keyword and each vector of the orthonormal basis is preferably stored in a first secret conversion table.

Consequently, the step of transforming each search keyword associated with a positive, resp. negative, operator in an positive, resp. negative, vector, of the orthonormal basis comprises preferably a step of providing the correspondences stored in the first secret conversion table.

As a matter of fact, the query is performed by the querier, who can be the owner itself or another entity. If the owner is the querier then he already has all the required information to convert the search keywords in vectors. In the other cases the querier needs to obtain some information from the owner.

To perform the query, the querier needs indeed to compute the query matrix and to this extent he needs to know the correspondence between the keywords and the vectors of the orthonormal basis. In case the querier is distinct from the owner there are two modes of operation:

a/ Either the owner provides directly to the querier the first secret conversion table, i.e. the index and the correspondence with the vectors, and then the querier can perform any query himself;

b/ Or the owner does not provide this information to the querier but requests instead the querier to send him the query in clear and the owner expresses it as the appropriate matrix. This imposes additional computations on the owner but provides him the ability to decide precisely which queries he wants to allow depending on the querier and the content of the query;

c/ An intermediary solution is that the owner provides the correspondence to a trusted intermediary who performs the translation according to policies provided to him by the owner.

Once the query is expressed in terms of vectors, the querier sends the query matrix to the encrypted search server. Alternatively, in the case b/ or c/ it is possible that the owner or the trusted intermediary sends the query matrix to the encrypted search server and only sends the final result to the querier.

According to one embodiment of the invention, each row of the query matrix further comprises a common vector corresponding to a common keyword which has been added to all the documents. The adding of this common vector enables to deal with the case where there are only keywords with negative operators in the search query.

To know if there is any document that matches the query, the multiplication between the search query expressed as a matrix and the resultant vector corresponding to each of the documents is performed.

For each document, if the result of the matrix multiplication between the query matrix and the associated resultant vectors is different from 1 in all rows, then the document does not match the search query. If this is the case for all documents, it means that no document matches the request and consequently, the method comprises a step of sending to the querier as a general result that none of the encrypted documents matches the search query.

If, for a document, the result of the multiplication between the query matrix and the corresponding resultant vectors is 1 in at least one row, then the document corresponding to the resultant vector matches the search query and consequently, the method comprises a step of sending that resultant vector to the querier as one of the matching resultant vector.

Then there are two cases depending on whether the encrypted search server and the storage provider are the same entity or not:

If they are the same entity, that entity knows which are the stored documents that correspond to the query and they send directly the encrypted document to the querier as a result, If they are two separate entities, then the encrypted search server can only send the resultant vector(s) of the document(s) matching the search query to the querier. The querier then needs to match this(ese) resultant vector(s) with the corresponding document(s). According to one embodiment of the invention, the association between each of the documents and each of the resultant vectors is stored in a second secret conversion table. In that case, the method comprises a step of identifying in the second secret conversion table which document is associated with the identified resultant vector. Another possibility is that this correspondence is known by the owner, so in case the querier is distinct from the owner he needs to fetch this information as well. Then there are three possibilities similar to the cases a, b and c presented above:

Either the owner provides the information to the querier who then requests directly the given documents from the storage provider;

Or the owner requests the documents from the storage provider and then forwards these documents to the querier (but does not provide to querier the correspondence);

Or a third party is in charge of making the correspondence between the resultant vectors and the documents, requests the documents from the storage provider and forwards them to the querier.

At this point the querier has the encrypted documents corresponding to his search query. To decrypt them he needs the secret key used by the owner to encrypt the documents. So there are again three cases similar to the cases a, b and c presented above:

Either the owner provides directly the key to the querier;

Or the querier has to send the encrypted documents to the owner who then decrypts them and send the clear documents to the querier;

Or the owner gives the key to a trusted intermediary who is in charge of decrypting the documents according to the policy provided to him by the owner;

Another aspect of the invention concerns a computer-readable medium on which is encoded a program code enabling to achieve the method according to the first aspect of the invention.

BRIEF DESCRIPTION OF THE DRAWINGS

FIG. 3 represents the step of a method according to one embodiment of the invention.

DETAILED DESCRIPTION

The present invention will now be described with reference to the accompanying drawings. The drawings are intended to provide one example of how the invention can be implemented and are not intended to limit the applicability of the present invention.

Figure 1:
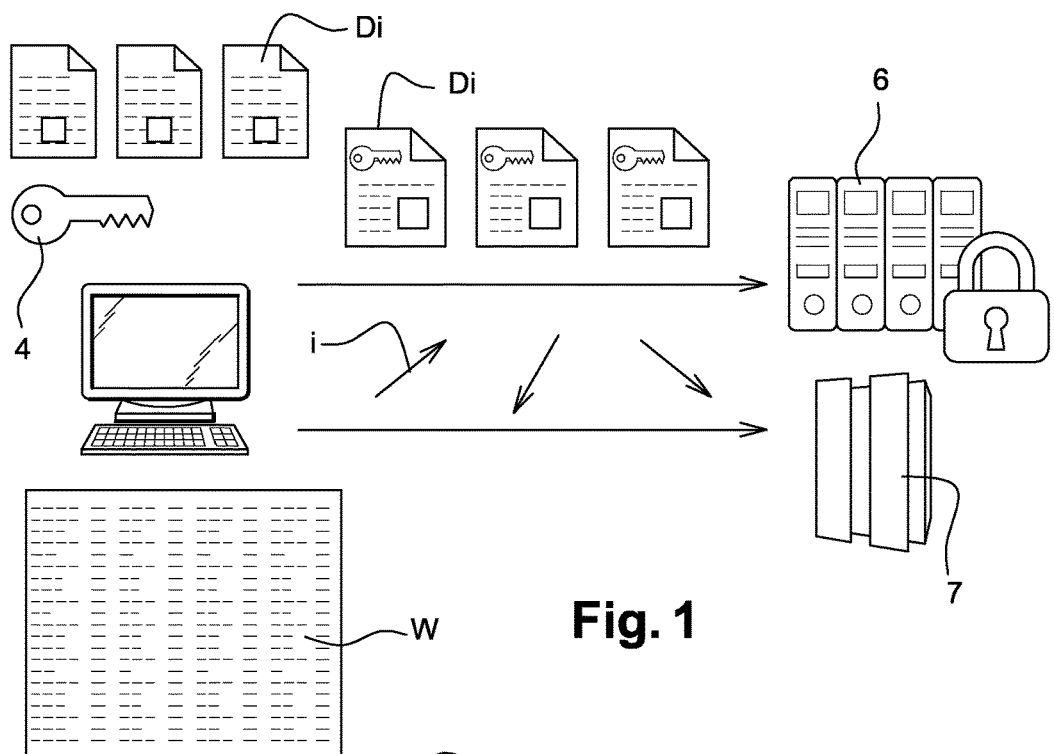
FIG. 1 represents a system to setup a method according to one embodiment of the invention.

As represented on FIG. 1, the method first comprises an initialization phase 101. The aim of that initialization phase 101 is the creation of the orthonormal basis.

To that purpose, a document owner has a set D of documents $D_i$ that he wants to encrypt. The first step 102 of the initialization phase 101 is the creation of an index W based on the documents $D_i$. This index W comprises all the set of keywords, each set of keywords containing keywords $w_k$ selected to describe each of the documents $D_i$. In that embodiment, the keywords are expressed in binary code. The keywords selected to describe one document $D_i$ can be for example some words contained in the document or they can be some words describing the document, such as tags for example. Each document $D_i$ can be described by one or several keywords. Moreover, it is advantageous to add to the sets of keywords of all the documents the same common keyword J. The common keyword J allows to deal with some particular cases such as when we have only negative words in a disjunctive clause in the search query.

The initialization phase 101 comprises then a step 106 of translating the index in an orthonormal basis.

That step 106 of translating the index in an orthonormal basis comprises first a step 103 of transforming the index in a free family $(f_i)_{i \in \{0,l\}}$, i.e. a family of independent vectors, from this index. To that purpose, we identify which keyword of the index presents the maximum length m, and then we pad all the keywords by adding 0's so that all the keywords of the index have the same length m. At the stage, the free family comprises then free keywords. The free keywords are ordered.

That step 106 of translating the index in an orthonormal basis comprises then a step 104 of transforming the free family $(f_i)_{i \in \{0,l\}}$ in an orthogonal family $(o_i)_{i \in \{0,l\}}$. To that purpose, we use the Gram-Schmidt orthogonalisation process as explained below.

According to the theorem of Gram-Schmidt:

If $(f_i)_{i \in \{0,l\}}$ is a free family of a pre-Hilbert space, there exists an orthogonal family $(o_i)_{i \in \{0,l\}}$ such that:

$\phi(o_i,o_j)=\phi(o_i,o_i)\delta_{i,j}$, $Vect(f_1, \ldots, f_l)=Vect(o_1, \ldots, o_l)$, The scalar product $\phi(o_i, f_i)$ is strictly positive.

Consequently, if we consider the ordered free family $(f_i)_{i \in \{0,l\}}$, according to the theorem of Gram-Schmidt, there is a unique orthogonal family $(o_i)_{i \in \{0,l\}}$ that we can construct following the Gram-Schmidt algorithm as:

$$o_i = f_i - \sum_{k=1}^{i-1} p_{o_k}(f_i)$$

Where $p_{o_k}(f_i)$ is defined as the orthogonal projection on a vector line led by $o_k$ i.e.:

$$p_{o_k}(f_i) = \frac{\phi(f_i, o_k)}{\phi(o_k, o_k)} o_k$$

$(o_i)_{i \in \{0,l\}}$ forms the new orthogonal family that verifies:

$\forall i \in \{1, \ldots, l\} \phi(o_i, o_j) = \phi(o_i, o_i)\delta_{i,j}$

At the stage, the orthogonal family comprises what we call orthogonal keywords.

That step 106 of translating the index in an orthonormal basis comprises then a step 105 of transforming the orthogonal family in an orthonormal family forming the orthonormal basis. To do that, we will make each orthogonal keyword of the orthogonal family orthonormal as follows:

$$\forall k \in \{1, \ldots, l\} \quad u_k = \frac{1}{\sqrt{\phi(o_k, o_k)}} o_k$$

$u_k$ are also called the vectors of the orthonormal basis or the orthonormal keywords.

At the end of this phase, we should point out that each keyword $w_k$ corresponds to one and only one orthogonal keyword $u_k$. In addition, the fact that the free family $(f_i)_{i \in \{0,l\}}$ is ordered implies that the construction according to the Gram Schmidt algorithm is unique. If we change the order of keywords, the algorithm outputs different orthonormal keywords. In fact, the order represents a secret of our construction that should be kept secret.

A different way of performing the step 106 of translating the index in an orthonormal basis could be to generate an orthonormal basis of size the number of keyword in the index and then associating each orthonormal vector to one keyword through any one to one function or by storing this correspondence in a first conversion table.

At the end of that step 106, each vector of the orthonormal basis corresponds to one and only one keyword of the index. The correspondence between the keywords and the vectors can be stored in a first conversion table, which can be owned by the owner of the document or by a trusted entity.

The initialization phase 101 comprises then a step 107 of associating a resultant vector $\chi_i$ in the span of the orthonormal basis to each document $D_i$. That resultant vector $\chi_i$ expresses what are the keywords associated with the document $D_i$.

To do that, the owner of the documents can choose a pseudo-random function $f:\{0,1\}^s \times \{0,1\}^n \to \{0,1\}^e$. After the step 106, each document $D_i$ in the set D is associated with a set $M_i$ of unique orthonormal keywords $(u_k)_{k \in M_i}$ where $M_i$ is then the set of vectors $u_k$ corresponding to the keywords $w_k$ used to describe $D_i$.

The resultant vector $\chi_i$ for each document $D_i$ is then computed by performing a linear combination of all the vectors corresponding to all the keywords characterizing the document and the secret coefficients:

$$\chi_i = \sum_{k \in M_i} f_{K_2}(u_k) \cdot u_k$$

The correspondence between the documents $D_i$ and the resultants vectors $\chi_i$ can be stored in a second secret conversion table. That second secret conversion table can be owned by the owner of the document or by a trusted entity.

The initialization phase 101 is now over and the documents can be encrypted. According to another embodiment of the invention, the documents could also have been encrypted just after the step 102 during which we have selected for each document a set of keywords characterizing the document.

Each document is then encrypted with a secret key 4 during a step of encryption 108. The encryption algorithm can be any standard one, and the owner keeps the key 4 secret.

After having performed these operations the owner can outsource the storage of the documents $D_i$: he sends the encrypted documents to a storage provider 6 and sends the resultant vectors $\chi_i$ to an encrypted search server 7. The method according to the invention is particularly advantageous because the encrypted search server 7 can perform the search just with the resultant vectors $\chi_i$, without opening the encrypted documents.

Figure 2:
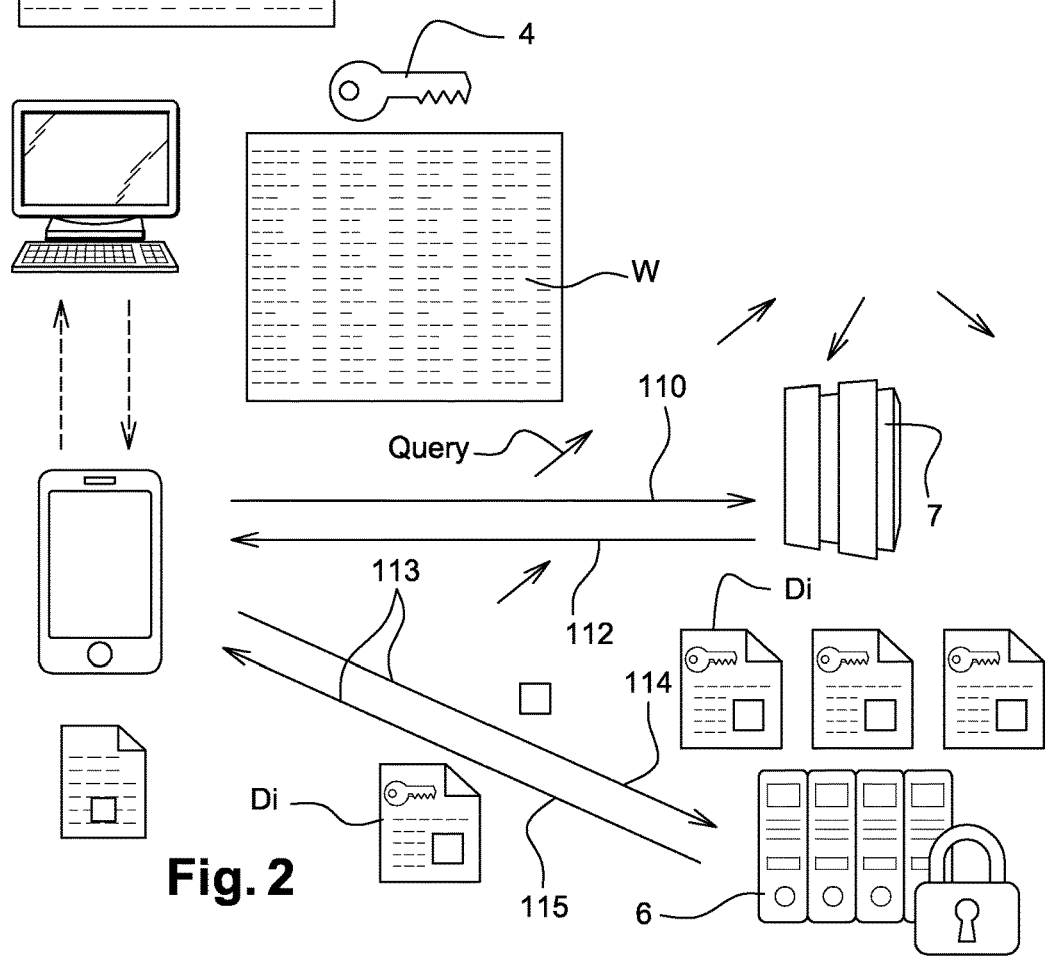
FIG. 2 represents a system implementing a method of search according to one embodiment of the invention.

The query phase 109 according to the invention will now be described with references to FIG. 2.

The query phase begins with a step 116 of receiving a search query from a querier. That search query is a Boolean search expressed in disjunctive normal form.

The query phase comprises a step 110 of transforming the search query in one query matrix of the orthonormal basis. To translate the search query into a query matrix, the keywords of the search query must be translated in vectors of the orthonormal basis. Each row of the query matrix is a linear combination of the obtained vectors.

So, for example, assume that the querier sends the following search query:

$$\bigvee_{i=1}^{t} \bigwedge_{j \in I_i} \circ w_j$$

Where the symbol ∘ means that we can have a keyword with or without the negation operator "not".

For each $$L_i = \bigwedge_{j \in I_i} \circ w_j,$$

let $p_j$ be the number of keywords associated with a positive operator in $L_i$, and $n_j$ be the number of keywords associated with a positive operator in $L_i$. For each i, and for each keyword of the search query associated with a positive operator, a constant $a_j$ is generated uniformly at random such that, $$a_j \xleftarrow{R} \{1, \ldots 2^h\}^{p_j}$$

whereas for each keyword of the search query associated with a negative operator, a constant $a_j'$ is generated uniformly at random such that $$a_j' \xleftarrow{R} \{-2^h, \ldots, -1\}^{n_j}.$$

For the common keyword added to all the document, a constant a is generated such that $$a \xleftarrow{R} \{1, \ldots, 2^h\}.$$

To obtain the $j^{th}$ row of the query matrix, we perform a linear combination of all the search vectors corresponding to the keywords of the $j^{th}$ conjunctive clause of the search query. For the sake of efficiency we gather together in a first sum the vectors corresponding to the keywords associated with a positive operator and in a second sum the vectors corresponding to the keywords associated with a negative operator. Moreover the vector corresponding to the common keyword is also separated of the first and the second sum.

Consequently, we obtain the following query matrix "Query":

$$\text{Query}\left(\bigvee_{i=1}^{t} \bigwedge_{j \in I_i} \circ w_j, K_2\right) = \begin{pmatrix} S_1 \\ \vdots \\ S_t \end{pmatrix}$$

With $$S_j = \frac{1}{a + \sum_{k \in P_j} a_{j,k}} \left( \sum_{k \in N_j} \frac{a_{j,k}'}{f_{K_2}(u_k)} u_k + \sum_{k \in P_j} \frac{a_{j,k}}{f_{K_2}} u_k + \frac{a}{f_{K_2}(J)} J \right)$$

Consequently, the $j^{th}$ row of the query matrix is expressed in three different parts:

$$\sum_{k \in N_j} \frac{a_{j,k}'}{f_{K_2}(u_k)} u_k$$

corresponding to the keywords of the search query associated with a negative operator;

$$\sum_{k \in P_j} \frac{a_{j,k}}{f_{K_2}(u_k)} u_k$$

corresponding to the keywords of the search query associated with a positive operator;

$$\frac{a}{f_{K_2}(J)} J$$

corresponding to the common keyword.

The constants a, a'$_j$ and a$_j$ are generated randomly so even if the same search query is performed several time, the constants a, a$_j$' and a$_j$ will be different from one search query to another. The method is then very secure since one cannot decrypt the query matrix to obtain the keywords used in the search query.

The query phase 108 comprises then a step 111 of determining a general result based on the result of the scalar multiplication between each row of the query matrix and the resultant vectors. The aim of that step 111 is to know if one of the encrypted documents matches the search query.

For each document, the multiplication between the query matrix and the resultant vector corresponding to the document is performed:

$$\text{Test}\left(\text{Query}\left(\bigvee_{i=1}^{t} \bigwedge_{j \in I_i} \circ w_j, K_2\right), \chi_i\right) = \text{Query}\left(\bigvee_{i=1}^{t} \bigwedge_{j \in I_i} \circ w_j, K_2\right) \cdot {}^t \chi_i$$

$$\text{Test}(.) = \begin{cases} \frac{1}{a + \sum_{k \in P_1} a_{j,k}} \left( \sum_{k \in N_1} \frac{a'_{1,k} f_{K_2}(u_l)}{f_{K_2}(u_k)} \phi(u_k, u_l) + \sum_{k \in P_1} \frac{a_{1,k} f_{K_2}(u_l)}{f_{K_2}(u_k)} \phi(u_k, u_l) + a \right) \\ \vdots \\ \frac{1}{a + \sum_{k \in P_t} a_{j,k}} \left( \sum_{k \in N_1} \frac{a'_{t,k} f_{K_2}(u_l)}{f_{K_2}(u_k)} \phi(u_k, u_l) + \sum_{k \in P_t} \frac{a_{t,k} f_{K_2}(u_l)}{f_{K_2}(u_k)} \phi(u_k, u_l) + a \right) \end{cases}$$

If the result of the multiplication between the query matrix and the resultant vector of a given document is different from 1 in all rows, then the said document does not match the search query.

If the result of the multiplication between the query matrix and the resultant vector of a given document is 1 in at least one row, the said document matches the search query and we include the resulting vector in the list of the corresponding resultant vectors.

The method comprises then a step 112 of sending the results to the querier. That result can be that none of the documents matches the search query in the first case, or the result can be the wanted resultant vector(s) in the second case.

The method can then comprise a step of finding the document(s) corresponding to the wanted resultant vector(s). To do that, the method can comprise a step 113 of identifying in the second secret conversion table which document(s) is associated with the wanted resultant vector(s).

The method can then comprise a step 114 of sending that encrypted document(s) to the querier. At this point the querier has the encrypted document(s) corresponding to his query. To decrypt them he needs the secret key used by the owner. So there are again three cases:

Either the owner provides directly the key to the querier;

Or the querier has to send the encrypted document(s) to the owner who then decrypts them and send the clear document(s) to the querier.

Or the owner gives the key to a trusted intermediary who is in charge of decrypting the document(s) according to the policy provided to him by the owner.

While the present invention has been particularly described with reference to the preferred embodiments, it should be readily apparent to those of ordinary skill in the art that changes and modifications in form and details may be made without departing from the scope of the invention.

The invention claimed is:

1. Method of retrieving encrypted documents stored in a computer memory by performing a boolean search over the encrypted documents, each document being characterized by a set of keywords, the method comprising:
    forming an index with the set of keywords characterizing the encrypted documents;
    translating the index in an orthonormal basis in which each keyword of the index corresponds to one and only one vector of the orthonormal basis;
    associating each document of the set of encrypted documents with a resultant vector in a span of the orthonormal basis, the resultant vector corresponding to each encrypted document stored in an encrypted search server comprising the computer memory;
    receiving a search query from a querier;
    transforming the search query into one query matrix; and
    determining a general result based on the result of the multiplication between the query matrix and each of the resultant vectors to retrieve encrypted documents from the computer that match the search query.

2. The method of claim 1, the step of translating the index in the orthonormal basis further comprising the steps of:
    transforming the index in a free family;
    transforming the free family in an orthogonal family; and
    transforming the orthogonal family in an orthonormal family which forms the orthonormal basis.

3. The method of claim 2, wherein the step of transforming the free family in an orthogonal family is achieved by using a Gram-Schmidt Orthogonalisation algorithm.

4. The method of claim 1, the step of translating the index in the orthonormal basis further comprising the steps of:
    generating an orthonormal basis of size the number of keywords in the index; and
    associating one vector of the orthonormal basis to each keyword of the index through any one to one function.

5. The method of claim 1, wherein the resultant vector associated with one of the documents is determined, prior to the encryption of the one of the documents, by performing a linear combination of all the vectors corresponding to all the keywords characterizing the one of the documents.

6. The method of claim 1, wherein the search query comprises search keywords, each keyword being associated with one negative or one positive operator, the step of transforming the search query in the query matrix comprising several rows comprises the following steps:
- expressing the search query in disjunctive normal form, as disjunction of conjunctive clauses,
- separating in each conjunctive clause the keywords associated with a positive operator from the keywords associated with a negative operator,
- transforming in each conjunctive clause:
  - each search keyword associated with a positive operator in a vector, called positive vector, in the span of the orthonormal basis;
  - each search keyword associated with a negative operator in a vector, called negative vector, in the span of the orthonormal basis; and
- determining the search query as a matrix where each row of the query matrix corresponds to one conjunctive clause and each row is a vector based on the positive and negative vectors, each row comprising a first sum in which the positive vectors are gathered and a second sum in which the negative vectors are gathered.

7. The method of claim 6, wherein correspondences between each keyword and each vector of the orthonormal basis are stored in a first secret conversion table.

8. The method of claim 6 wherein the step of transforming each search keyword associated with a positive, or negative, operator in an positive, or negative, vector, of the orthonormal basis comprises a step of providing the correspondences stored in the first secret conversion table.

9. The method of claim 6, wherein each row of the query matrix further comprises a common vector corresponding to a common keyword which has been added to all the documents.

10. The method of claim 1, wherein, if the result of the multiplication between the query matrix and a given resultant vector is 1 in at least one row, the method comprises a step of sending that resultant vector to the querier as one of wanted resultant vectors.

11. The method of claim 10, wherein the association between each of the documents and each of the resultant vectors is stored in a second secret conversion table.

12. The method of claim 10, further comprising a step of identifying in a second secret conversion table which document is associated with the wanted resultant vector.

13. The method of claim 1, wherein if the result of the multiplication between the query matrix and all the resultant vectors is different from 1 in all the rows, the method comprises a step of sending to the querier that none of the encrypted documents matches the search query.

14. A non-transitory computer-readable storage device storing computer-executable instructions which, when executed by a processor of a computing device, cause the processor perform a method of retrieving encrypted documents stored in a computer memory by performing a boolean search over the encrypted documents, each document being characterized by a set of keywords, the method comprising:
- forming an index with the set of keywords characterizing the encrypted documents;
- translating the index in an orthonormal basis in which each keyword of the index corresponds to one and only one vector of the orthonormal basis;
- associating each document of the set of encrypted documents with a resultant vector in a span of the orthonormal basis, the resultant vector corresponding to each encrypted document stored in an encrypted search server comprising the computer memory;
- receiving a search query from a querier;
- transforming the search query in one query matrix; and
- determining a general result based on the result of the multiplication between the query matrix and each of the resultant vectors to retrieve encrypted documents from the computer that match the search query.

\* \* \* \* \*